United States Patent [19]

Liu

[11] Patent Number: 5,210,737
[45] Date of Patent: May 11, 1993

[54] SEPARABLE COMPACT DISC PLAYER WITH AN ELASTIC HOLD-DOWN MEMBER

[75] Inventor: Ping-Hsiung Liu, Tainan Hsien, Taiwan

[73] Assignee: Hanpin Electron Co., Ltd., Tainan Hsien, Taiwan

[21] Appl. No.: 783,772

[22] Filed: Oct. 29, 1991

[51] Int. Cl.$^5$ .............................................. H05K 7/00
[52] U.S. Cl. ................... 369/75.1; 369/75.2; 361/395
[58] Field of Search ............... 369/75.1, 75.2; 360/97.01; 361/395

[56] References Cited

U.S. PATENT DOCUMENTS 4,914,550  4/1990  Filsinger et al. ............... 361/395
5,179,504  1/1993  Kitahara ........................ 361/395

*Primary Examiner*—Edward P. Westin
*Assistant Examiner*—S. Allen

*Attorney, Agent, or Firm*—Morton J. Rosenberg; David I. Klein

[57] ABSTRACT

A separable compact disc player with an elastic hold-down member consists of a cabinet, a base and a dust cover. The improvement of the present invention is that a hold-down member which is beneath one side of the base includes a hold-down block disposed at the external end of the hold-down member, a rod protruding out of an elliptical slot of the base and a blind hole disposed in the internal end of the hold-down member. The blind hole is capable of being inserted and pushed by one end of a spring member whose the other end is fastened on an under wall of the base. Under the elasticity of the spring member, the hold-down member is capable of easily protruding into or being withdrawn from a longitudinally contoured through hole of the cabinet so as to assemble or disassemble the base and the cabinet rapidly.

4 Claims, 5 Drawing Sheets

SEPARABLE COMPACT DISC PLAYER WITH AN ELASTIC HOLD-DOWN MEMBER

BACKGROUND OF THE INVENTION

1. Field of the Invention

This invention relates to a separable compact disc player and more particularly to a compact disc player having an elastic hold-down member.

2. Description of the Prior Art

Conventionally, a compact disc player includes a base 4, a dust cover 5 and a cabinet 6, as shown in FIG. 5. The base 4 has a depressed portion 41 in its central part and four posts 43 disposed under its four corners. The depressed portion 41 with a vertical side wall 411 comprises a plateform 42 having a turntable spindle 421 and a longitudinally contoured aperture 422 disposed thereon. A laser member 423 disposed in the longitudinally contoured aperture 422 is allowed to move rightwardly and leftwardly so as to read stored information of a compact disc. A printed circular board 44 is screwed between the four posts 43. The dust cover 5 including a spindle cover 51 and a viewer 52 is provided to cover on the depressed portion 41. The base 4 combined with the dust cover 5 is capable of being screwed into the cabinet 6.

However, there are some shortcomings in the known compact disc player described as follows:

1. The screwing method of the base 4 and the cabinet 5 of the known compact disc player is inconvenient for a repairman to disassemble the base 4 and the cabinet 5. Moreover, the base 4 assembled with the cabinet 5 only with screws, in fact, has very bad shock-proof function. For example, when a loudspeaker is sounded with higher output power, sound oscillation may indirectly influence the stability of a compact disc which is rotating in the known compact disc player; therefore, the laser member 423 of the known compact disc player may read incorrect information from the compact disc so as to influence the quality of the emitting sound and music.

2. The known compact disc player has to be assembled before package and delivery, and this will increase delivery cost and the possibility of the known compact disc player being damaged in the delivery.

3. When a user is looking through the viewer 52 of the known compact disc player to see whether a rotating compact disc has been placed well or not, the viewer 52 of the known compact disc player has no eye shield member to protect the user's eyes from the damage of the laser member 423.

4. The depressed portion 41 with a vertical side wall 411 fails to help a compact disc quickly and stably to be placed on the turntable spindle 421 so that the surface of the compact disc may get rubbed in the placement of the turntable spindle 421.

5. The printed circuit board 44 of the known compact disc player is very big and makes the whole known compact disc player waste too much space.

SUMMARY OF THE INVENTION

A principal object of the present invention is to provide an elastic hold-down member for easily and rapidly assembling or disassembling a base from a cabinet.

Another object of the present invention is to provide an eye shield member attached around the inner surface of a viewer so as to protect a user's eyes from the damage of a laser member of the base.

Yet another object of the present invention is to provide a slant arcuate side wall disposed on one side of a central depressed portion so that the slant arcuate face of the slant arcuate side wall may help a compact disc to be rapidly placed on a turntable spindle.

Still another object of the present invention is to provide a laminated structure for mounting several smaller precise printed circuit boards.

According to the preferred embodiment of the present invention having the objects, there are some apparent advantages described as follows: 1. The movement of the elastic hold-down member allows a user or a repairman to assemble or disassemble the base and the cabinet rapidly.

2. A gap between a longitudinally contoured through hole of the cabinet and the top surface of the elastic hold-down member provides a rotating compact disc better shock-proof function so that the laser member of the present invention can read correct stored information from the rotating compact disc and thus to keep the emitting sound or music perfect.

3. The eye shield member is capable of protecting a user's eyes from the damage of the laser member when the user looks through the viewer of the present invention to inspect the rotatory condition of a compact disc.

4. The slant arcuate face of the slant arcuate side wall of the present invention of the central depressed portion of the base may rapidly help a compact disc to be placed on a turntable spindle without any friction on the surface of the compact disc.

5. The laminated structure is designed at the lower portions of several posts which are disposed beneath the base. Posts which are disposed beneath one side of the base have a plurality of grooves disposed on their lower portions for mounting a plurality of printed circular boards. The lower portions of the other posts which are beneath the opposing side of the base are also capable of mounting the opposing sides of the plurality of printed circular boards. A plurality of washers being capable of being, respectively, inserted into each space between the opposing sides of plurality of laminated printed circular boards. The laminated structure at the lower portions of the posts of the base allows the posts to mount a plurality of smaller precise printed circuit boards instead of a big printed circular boards, by which the compact disc player of the present invention is capable of saving much space.

6. The compact disc player of the present invention with smaller volume is capable of decreasing production cost, delivery cost and the damage in the delivery, by which the compact disc player of the present invention is competitive in the market.

BRIEF DESCRIPTION OF THE DRAWINGS

The invention will be better understood by reference to the accompany drawings, wherein:

FIG. 3A is an enlarged cross-sectional view showing an inward movement of an elastic hold-down member of the preferred embodiment of the present invention;

DESCRIPTION OF THE PREFERRED EMBODIMENTS

Figure 1:
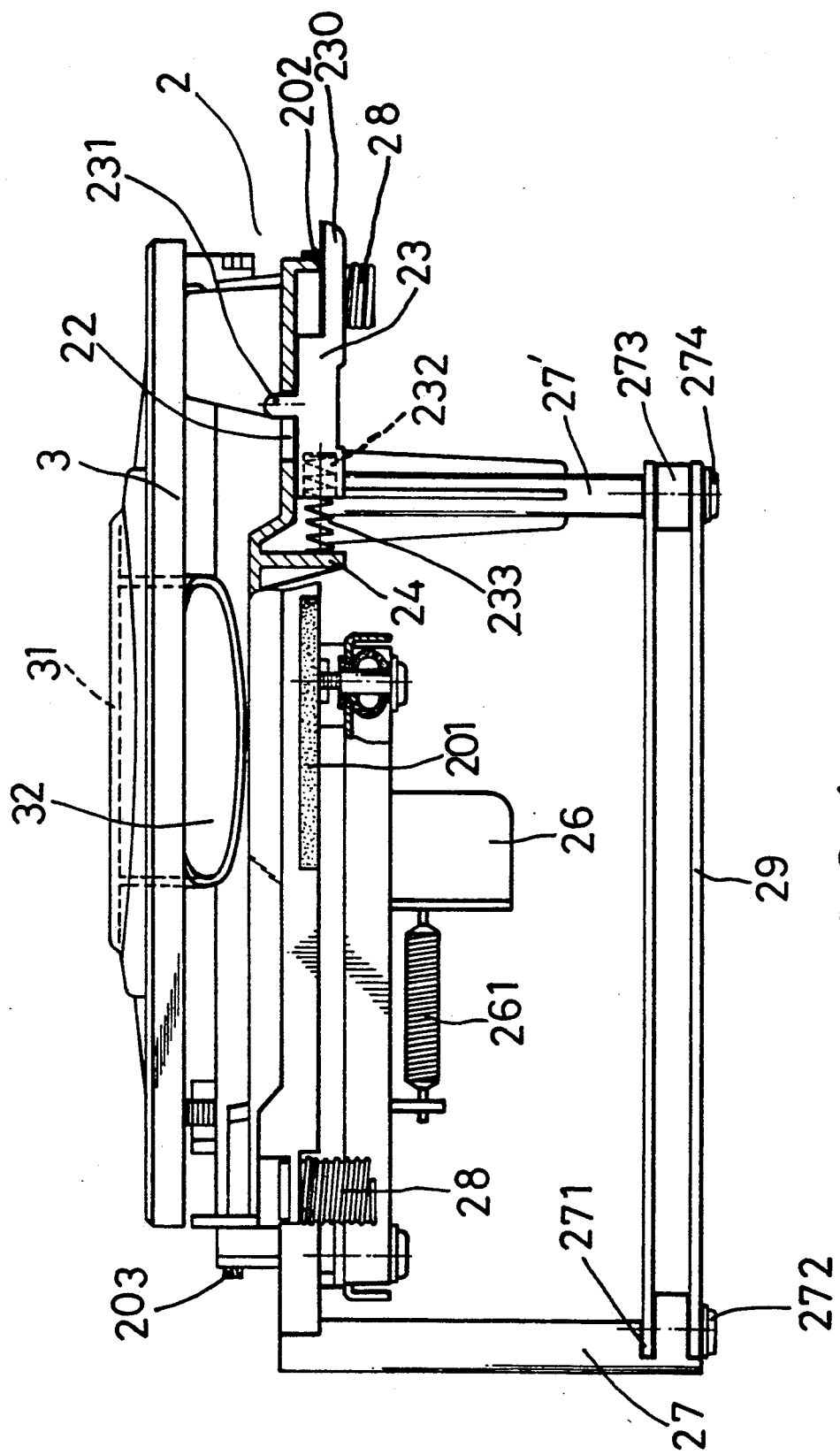
FIG. 1 is a side and partial cross-sectional view showing a preferred embodiment of the present invention having a dust cover and a base in assembled condition.
Figure 2:
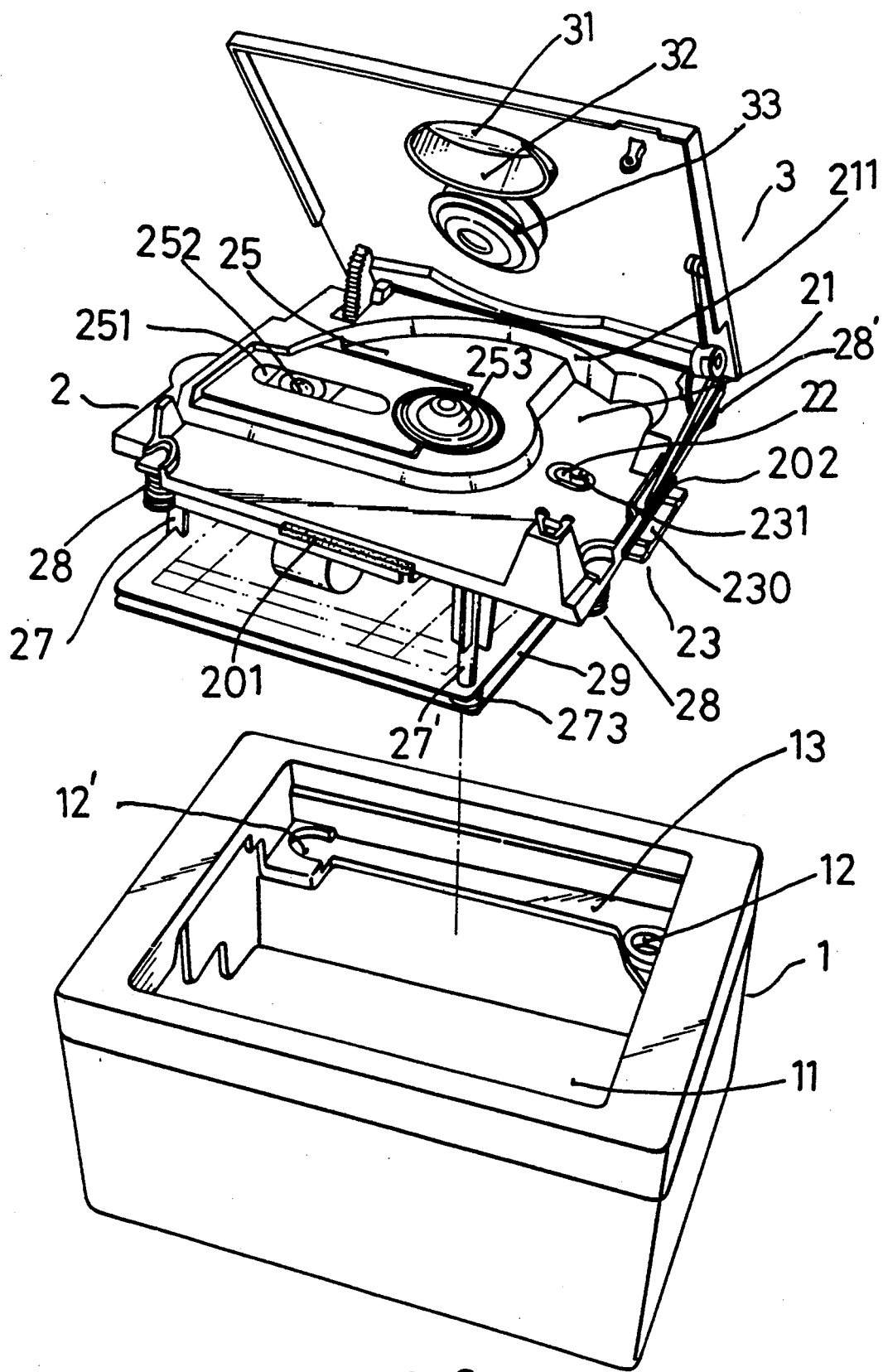
FIG. 2 is a perspective view showing the preferred embodiment of the present invention having the base and a cabinet in disassembled condition.

As shown in FIGS. 1 and 2, the present invention is directed to a separable compact player including a cabinet 1, a base 2 and a dust cover 3.

Figure 3:
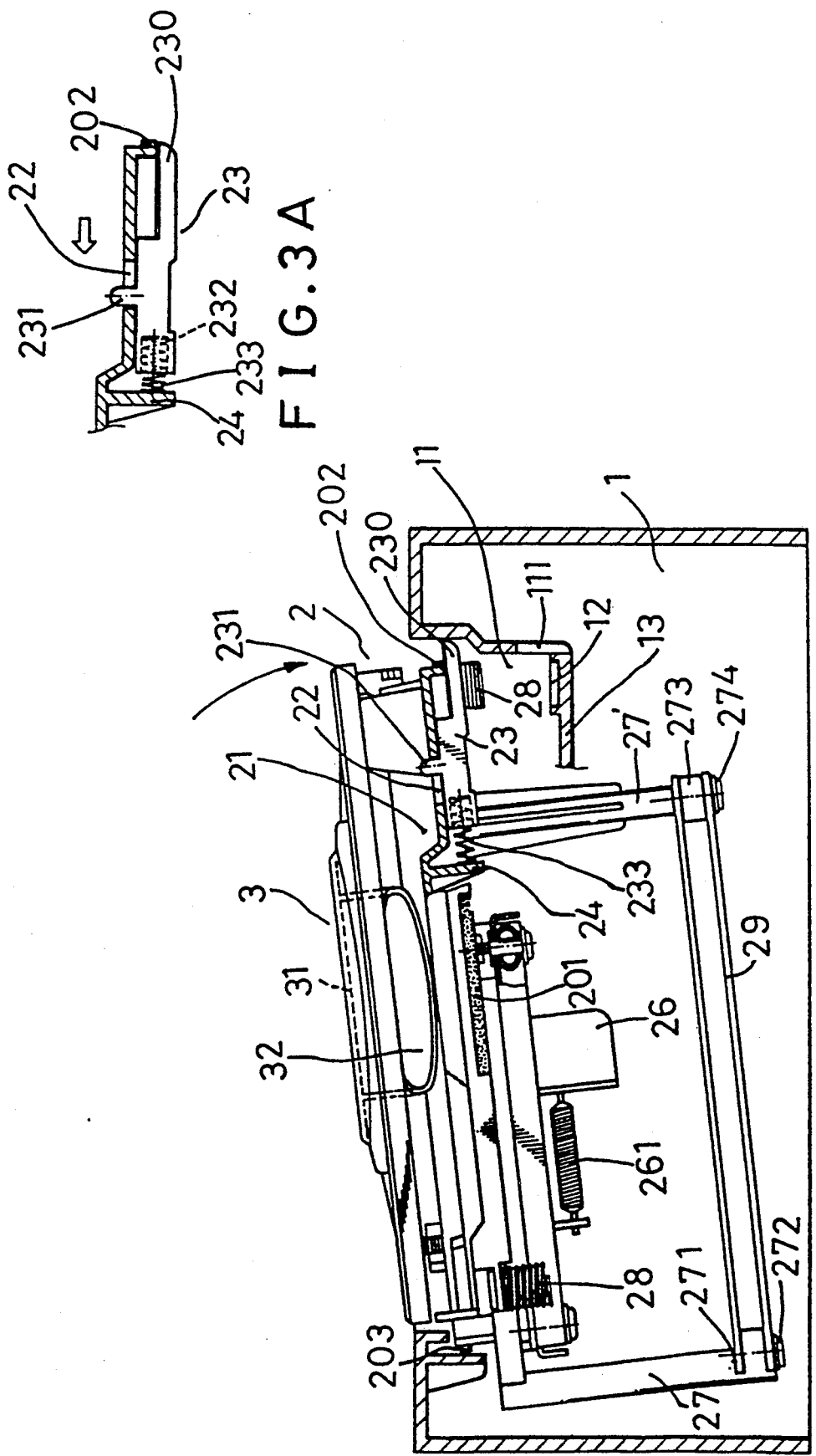
FIG. 3 is a side and partial cross-sectional view showing the base being going to be put into the cabinet.
Figure 4:
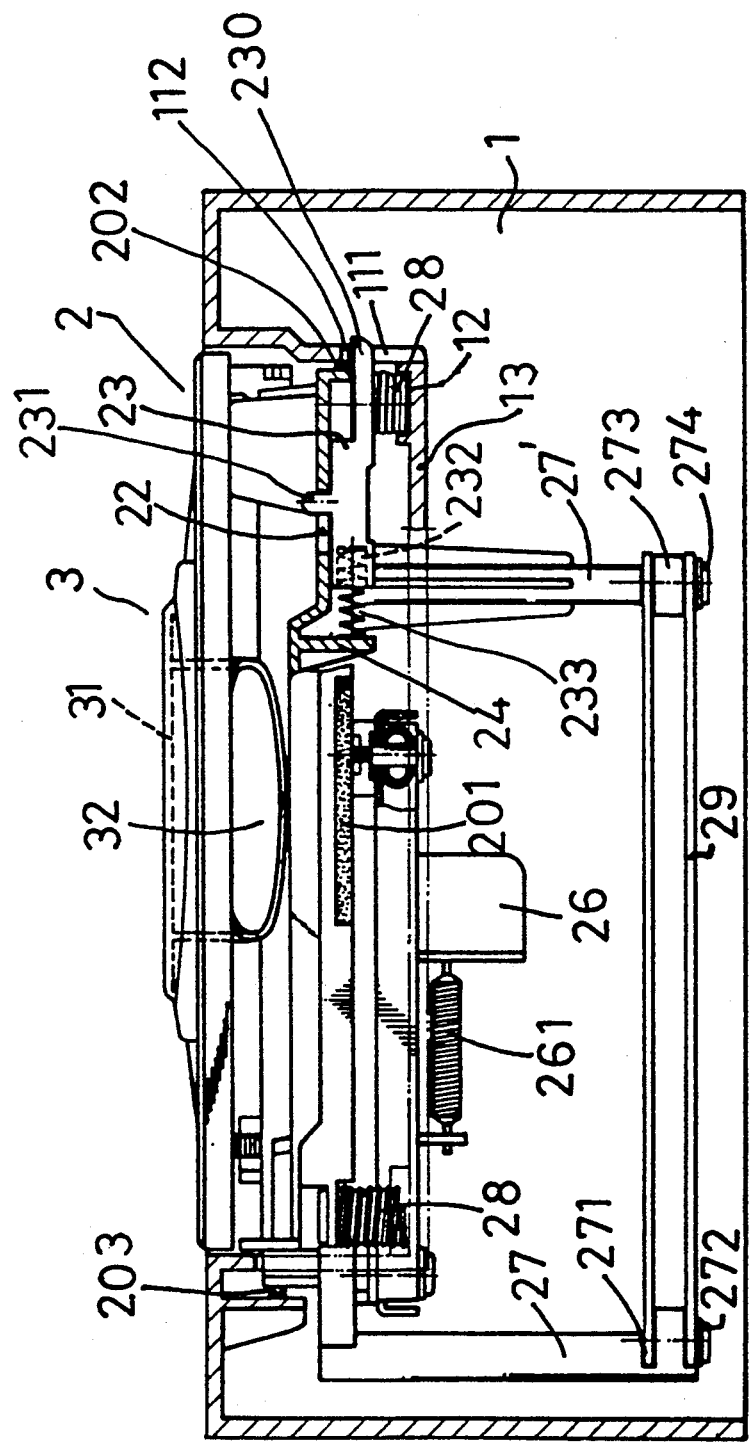
FIG. 4 is a side and partial cross-sectional view showing the base having been assembled with the cabinet; and, FIG. 5 is a perspective view showing the appearance of a known compact disc player.
Figure 5:
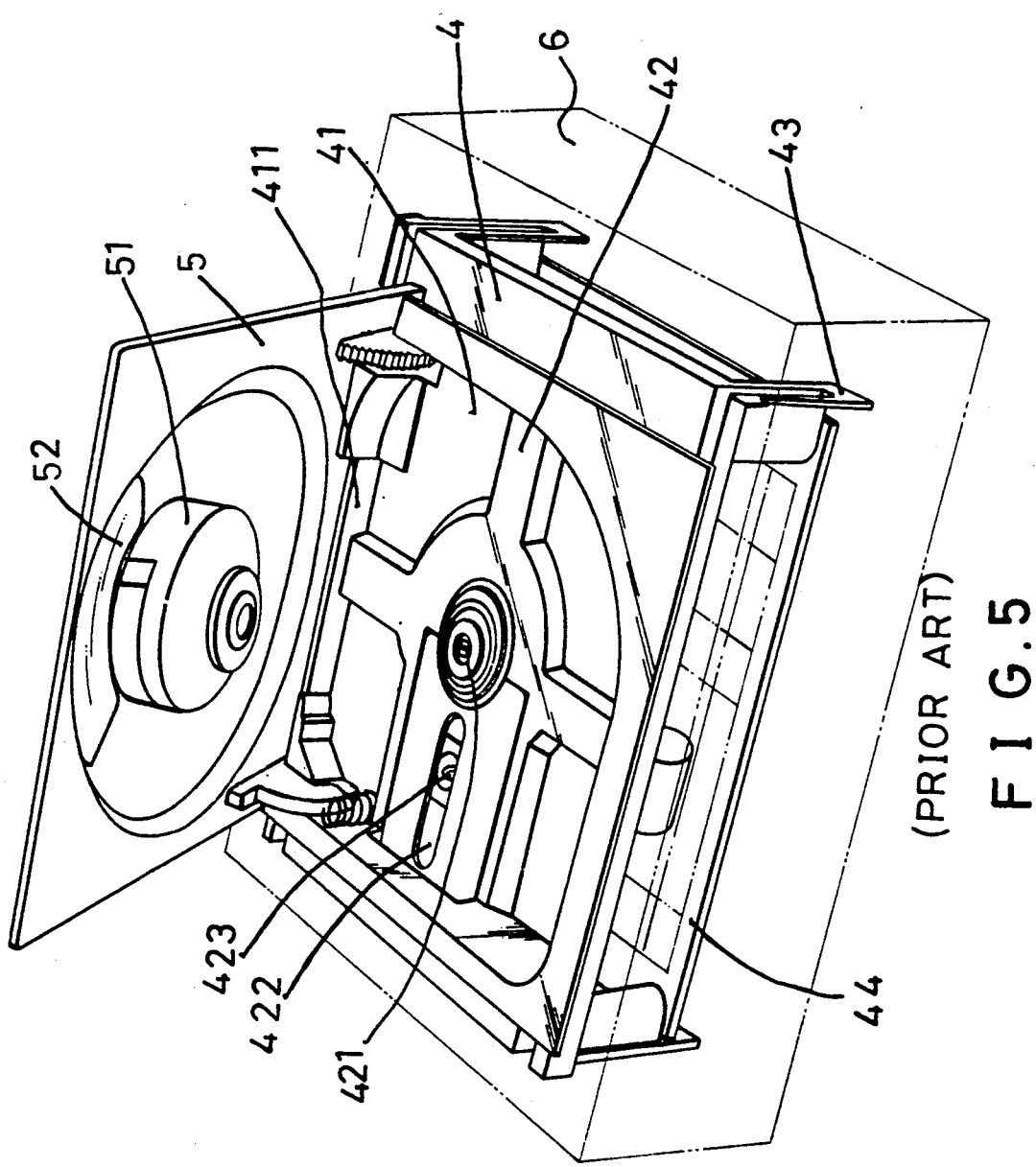

The cabinet 1 defining a hollow container includes a central chamber 11 wherein there are two partition members 13, respectively, disposed on two opposing side walls of the chamber and a longitudinally contoured through hole 111 disposed on a side wall of the central chamber 11, as shown in FIGS. 3 and 4. Each partition member 13 has a circular hole 12 on one end of the partition member 13 and an arcuate hole 12' on the other end of the partition member 13, as shown in FIG. 2.

The base 2 having protective liners 201, 202 and 203 attached on its front, right and left side walls includes a central depressed portion 21, an elliptical slot 22, a hold-down member 23, an under wall 24, a plateform 25, a motor 26, posts 27 and 27', spring members 28 and printed circuit boards 29, as shown in FIGS. 1 and 2.

The central depressed portion 21 has a slant arcuate side wall 211, as shown in FIG. 2.

The hold-down member 23 which is beneath one side of the base 2 includes a hold-down block 230 disposed at the external end of the hold-down member 23, a rod 231 protruding out of the elliptical slot 22 and a blind hole 232 disposed in the internal end of the hold-down member 23. The blind hole 232 is capable of being inserted and pushed by one end of a spring member 233 whose the other end is fastened on the under wall 24, as shown in FIG. 1.

The plateform 25 includes a longitudinally contoured aperture 251, a laser member 252 and a turntable spindle 253. The laser member 252 is disposed in the longitudinally contoured aperture 251, as shown in FIG. 2.

Beneath the base 2, there are a motor 26, posts 27 and 27', and spring members 28. The motor 26 coupled with a drive shaft 261 is just placed under the plateform 25.

Beneath one side of the base 2, there are several posts 27. Each post 27 has a plurality of grooves 271 at the lower portion of the post 27. Each groove 271 is capable of mounting one side of a printed circuit board 29. Several screws 272, respectively, screwed beneath the lower ends of the posts 27 are capable of fastening one sides of the plurality of laminated printed circuit boards 29. Beneath the opposing side of the base 2 having the posts 27, there are several posts 27'. The lower portions of the posts 27' are capable of mounting the opposing sides of the plurality of printed circuit boards 29. A plurality of washers 273 are capable of being, respectively, inserted into each space between the opposing sides of the plurality of printed circuit boards 29. Several screws 274, respectively, screwed beneath the lower ends of the posts 27' are capable of fastening the opposing sides of the plurality of laminated printed circuit boards 29 and the plurality of inserted washers 273.

The spring members 28 are disposed beneath the four corners of the base 2.

The dust cover 3 includes a viewer 31, an eye shield member 32 and a spindle cover 33. The eye shield member 32 is attached around the inner surface of the viewer 31. The spindle cover 33 is placed correspondly to cover the turntable spindle 253 of the base 2.

In assemblage, as shown in FIG. 3, the dust cover 3 has been already joined to the base 2. Initially, one side of the base 2 is slantly put down into the chamber 11 of the cabinet 1. And then, the rod 231 of the hold-down member 23 which is on the opposing side of the base 2 is pulled inwardly so as to compress the spring member 233 and to pull the hold-down block 230 back beneath the base 2, as shown in FIG. 3A. At the moment, the opposing side of the base 2 is capable of being put down into the chamber 11 of the cabinet 1. As soon as the rod 231 is released, the elasticity of the spring member 233 will immediately push the hold-down block 230 outwardly to protrude into the longitudinally contoured through hole 111 of the chamber 11 so as to firmly fasten the base 2 into the chamber 11 of the cabinet 1, as shown in FIG. 4. The spring members 28 will be, respectively, mounted into the circular holes 12 and the arcuate holes 12'. A gap 112 between the longitudinally contoured through hole 111 and the top surface of the hold-down block 230 will provide better shock-proof function for the base 2. Moreover, the protective liners 201, 202, 203 respectively attached on the front, right and left side walls of the base 2 and the spring members 28 located between the base 2 and the cabinet 1 are capable of increasing the stability of the base 2 and the cabinet 1 so that a compact disc placed on the turntable spindle 253 may be rotated more smoothly.

While the preferred embodiments of the invention have been described above, it will be recognized and understood that various modifications may be made therein and the appended claims are intended to cover all such modifications which may fall within the spirit and scope of the invention.

What is claimed is:

1. A separable compact disc player with an elastic hold-down member comprising:

a cabinet defining a hollow container and including a central chamber, two partition members and a longitudinally contoured through hole, each said partition member having a circular hole on one end of said partition member and an arcuate hole on the other end of said partition member, said longitudinally contoured through hole disposed on a side wall of said central chamber;

a base including a central depressed portion, an elliptical slot, a hold-down member, an under wall, a plateform, a motor, posts, spring members and printed circuit boards, said hold-down member being beneath one side of said base, said plateform including a longitudinally contoured aperture, a laser member and a turntable spindle, said laser member being disposed in said longitudinally contoured aperture, said motor, said posts and said spring members being disposed beneath said base, said printed circuit boards being mounted at the lower portions of said posts; and said dust cover including a viewer, an eye shield member and a spindle cover;

the improvement which comprises:

said hold-down member including a hold-down block disposed at the external end of said hold-down member, a rod protruding out of said elliptical slot of said base and a blind hole disposed in the internal end of said hold-down member, said blind hole being capable of being inserted and pushed by one end of a spring member whose the other end is fastened on said under wall of said base, said hold-down member being capable of easily protruding into or being withdrawn from said longitudinal contoured through hole of said cabinet under the elasticity of said spring member so as to assemble or disassemble said base and said cabinet rapidly.

2. A separable compact disc player with an elastic hold-down member according to claim 1, wherein said eye shield member of said dust cover is attached around the inner surface of said viewer of said dust cover for protecting a user's eyes from the damage of said laser member of said plateform of said base.

3. A separable compact disc player with an elastic hold-down member according to claim 1, wherein said central depressed portion of said base has a slant arcuate side wall for helping a compact disc to be placed on said turntable spindle of said plateform rapidly.

4. A separable compact disc player with an elastic hold-down member according to claim 1, wherein there are several posts beneath one side of said base, each said post having a plurality of grooves at the lower portion of said post, each said groove being capable of mounting one side of a printed circuit board, several screws being capable of fastening one sides of said plurality of laminated printed circuit boards; there also are several posts beneath the opposing side of said base, the lower portions of said posts being capable of mounting the opposing sides of said plurality of said printed circuit boards, a plurality of washers being capable of being, respectively, inserted into each space between the opposing sides of said plurality of printed circuit boards, several screws being capable of fastening the opposing sides of said plurality of laminated printed circuit boards and said plurality of inserted washers.

* * * * *